(12) United States Patent
Kolokowsky

(10) Patent No.: US 7,818,701 B1
(45) Date of Patent: Oct. 19, 2010

(54) MEMORY CONTROLLER WITH VARIABLE ZONE SIZE

(75) Inventor: Stephen Kolokowsky, San Diego, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 923 days.

(21) Appl. No.: 11/644,073

(22) Filed: Dec. 22, 2006

(51) Int. Cl.
*G06F 17/50* (2006.01)
*G06F 13/00* (2006.01)

(52) U.S. Cl. .................. 716/8; 716/16; 716/7; 711/173
(58) Field of Classification Search ............ 716/8, 716/16, 7; 711/173
See application file for complete search history.

(56) References Cited

U.S. PATENT DOCUMENTS

| | | | | |
|---|---|---|---|---|
| 5,339,400 A * | 8/1994 | Iijima | | 711/115 |
| 6,088,777 A * | 7/2000 | Sorber | | 711/171 |
| 6,718,430 B2 * | 4/2004 | Lin et al. | | 711/103 |
| 6,842,823 B1 * | 1/2005 | Olson | | 711/129 |
| 7,149,871 B2 * | 12/2006 | Conley | | 711/173 |
| 7,404,060 B2 * | 7/2008 | Hoshina | | 711/170 |
| 7,529,905 B2 * | 5/2009 | Sinclair | | 711/170 |
| 7,734,864 B2 * | 6/2010 | Maeda et al. | | 711/103 |
| 2004/0111553 A1 * | 6/2004 | Conley | | 711/103 |
| 2005/0005059 A1 * | 1/2005 | Tanaka et al. | | 711/103 |
| 2005/0071595 A1 * | 3/2005 | Irish et al. | | 711/170 |
| 2006/0206681 A1 * | 9/2006 | Suzuki et al. | | 711/170 |
| 2010/0121935 A1 * | 5/2010 | Holt | | 709/215 |

* cited by examiner

*Primary Examiner*—Phallaka Kik

(57) ABSTRACT

Disclosed is a method of partitioning a memory, comprising dividing the memory into a first plurality of sub-zones, allocating a plurality of spare blocks in each of the first plurality of sub-zones, resizing the first plurality of sub-zones to a second plurality of sub-zones different from the first plurality, and reallocating the plurality of spare blocks among the second plurality of sub-zones. A circuit for an improved memory controller is described also.

20 Claims, 7 Drawing Sheets

---PRIOR ART---

MEMORY CONTROLLER WITH VARIABLE ZONE SIZE

TECHNICAL FIELD

The present invention relates generally to electronic circuits, and in particular to memory controller circuits.

BACKGROUND

Flash memory is a form of non-volatile computer memory that can be electrically erased and reprogrammed. Flash memory is erased and programmed in blocks comprising multiple locations. Flash memory is widely used wherever a significant amount of non-volatile, solid-state storage is needed. Conventional flash memory applications include digital audio players, digital cameras and mobile phones. Flash memory is also used in USB flash drives (thumb drives), which are used for general storage and transfer of data between computers. It is also used in video game consoles to store game save data.

SmartMedia™ is a memory card standard using flash memory, developed by Toshiba Corporation. Typically, a SmartMedia™ card is used as storage media for a portable device, in a form that can easily be removed for access by a PC.

When compared to a hard disk drive, a limitation of flash memory is that flash memory has a finite number of erase-write cycles (most commercially available flash products are guaranteed to withstand one hundred thousand programming cycles) so that care has to be taken when moving traditionally hard-drive based applications, such as operating systems, to flash-memory based devices such as CompactFlash. This effect is partially offset by some chip firmware or filesystem drivers by counting the writes and dynamically remapping the blocks in order to spread the write operations between the sectors, or by write verification and remapping to spare sectors in case of write failure.

Low-level access to a physical flash memory by device driver software is different from accessing common memories. Whereas a common RAM will simply respond to read and write operations by returning the contents or altering them immediately, flash memories need special considerations, especially when used as program memory akin to a read-only memory (ROM).

One limitation of conventional NOR flash memory is that although it can be read or programmed a byte or a word at a time in a random access fashion, it must be erased a "block" at a time. Starting with a freshly erased block, any byte within that block can be programmed. However, once a byte has been programmed, it cannot be changed again until the entire block is erased. NOR flash memory offers random-access read and programming operations, but cannot offer random-access rewrite or erase operations.

In NAND flash memory reading data can not be performed on individual addresses. Reading, erasing and writing operations are performed block-wise on all NAND flash memories. NAND flash memory is conventionally organized in zones of 1024 blocks. In each zone, 1000 blocks are used for data storage, and 24 are reserved against bad NAND blocks. This memory organization scheme originated with the SmartMedia™ specification. Manufacturers of NAND memories typically guarantee only 1000 out of 1024 good blocks over the life of the NAND.

One block is equal to one Megabit, or one million bits. This is 128 KiloBytes (KB). One zone is 1024 blocks, so is 128 MegaBytes (MB). For example, a 1 GigaByte (GB) Flash drive would have 8 zones of memory. The purpose of having zones is to allow leeway for partial block copies, and to allow for bad blocks. Zones work in the following manner. To write new data into the middle of a block, an erased block is selected from the pool of good erased blocks. The front portion (if any) of the old block is copied into the new block, then the overwritten portion is written to the new block, then the remaining portion of the old block is copied to the new block. When all of the data has been replaced or copied, then the old block is erased.

When reading data from and writing data to a conventional flash memory, there is a performance penalty for crossing a zone boundary because the logical to physical table must be reloaded. If the flash memory is being used as a disk drive, this penalty is minimal because most disk drive accesses are sequential or linear. This means that the probability of a zone transition is much lower than if the accesses were random.

New applications such as ReadyBoost use flash memory as a cache memory which causes more zone boundary crossings. ReadyBoost is a software standard designed by Microsoft, which makes PCs running Windows Vista more responsive by using flash memory on a USB drive (USB 2.0 only), secure digital (SD) Card, Compact Flash, or other form of flash memory as a disk cache to boost system performance. When such a device is plugged in, the Microsoft Windows Autoplay dialog offers an additional option to use it to speed up the system, an additional "Memory" tab is added to the drive's properties dialog where the amount of space to be used can be configured.

FIG. 1 shows a first conventional computer system 100 using an external memory as a disk cache. The system 100 comprises a hard disk drive 110, and a bus 120 coupling the hard disk drive 110 to a motherboard bridge chip 130. The motherboard bridge chip may be a northbridge chip, or a southbridge chip, or another type of combination bridge chip.

A northbridge, also known as the Memory Controller Hub (MCH), is traditionally one of the two chips in the core logic chipset on a PC motherboard, the other being the Southbridge. Separating the chipset into Northbridge and Southbridge is common, although in some conventional solutions these two chips have been combined onto one die when design complexity and fabrication processes permit it. The northbridge typically handles communications between the central processing unit (CPU), random access memory (RAM), advanced graphics protocol (AGP) or peripheral component interconnect express (PCI-X), and the southbridge. Some northbridges also contain integrated video controllers, which are also known as a graphics and memory controller hub (GMCH).

A southbridge, also known as the input/output (I/O) controller hub (ICH), is a chip that implements the "slower" capabilities of the motherboard in a northbridge/southbridge chipset computer architecture. The southbridge can usually be distinguished from the northbridge by not being directly connected to the CPU. Rather, the northbridge ties the southbridge to the CPU.

The bridge chip 130 is coupled via bus 140 to a universal serial bus (USB) controller 150. In one embodiment, the controller 150 is a USB host controller. The controller 150 is coupled by USB bus 160 to a USB memory device 170 (often referred to as a 'flash drive' or 'thumb drive'). USB flash drives are usually NAND-type flash memory data storage devices integrated with a USB interface. They are typically small, lightweight, removable and rewritable. Memory capacity typically ranges from 8 megabytes up to 64 gigabytes, limited only by flash memory densities.

In the conventional system 100, if the bridge chip 130 (driven by the central processing unit) attempts to use the conventional USB memory device 170 as a disk cache memory, the cache memory accesses are random in fashion (unlike the linear accesses of regular flash memory storage, used like a disk drive). The random accesses are likely to result in page faults, reducing system throughput and performance.

The effect of this is similar to fragmentation of a personal computer hard drive. When files are fragmented on a hard drive, file access is no longer linear. Fragmented file access is much slower than linear access, since the disk must now rotate further and move the head more to access the dispersed sectors.

FIG. 2 shoes a conventional system 200 comprising a hard disk drive 210, and a bus 220 coupling the hard disk drive 210 to a motherboard bridge chip 230. The motherboard bridge chip 230 incorporates a USB host controller 240 in the same chip/package as bridge 230. The USB controller 240 is coupled by USB bus 250 to a USB memory device 270 (often referred to as a 'flash drive' or 'thumb drive').

The conventional system 200 suffers from the same problem of random access when using the USB memory as a cache, since random access to the device produces a page fault probability determined by the number of zones less the number of logical to physical tables in the ram, divided by the number of zones. This can be expressed as:

$$\frac{numberOfZones - 12pTablesInRAM}{numberOfZones} \qquad \text{Eq.1}$$

For a typical 1 GByte design with 8 zones and one logical to physical table stored in RAM, 87.5% of random accesses result in a reload of the 1024 entry logical to physical table.

It would be desirable to have a solution allowing use of portable memory devices for disk cache memory.

DETAILED DESCRIPTION

An embodiment is described of an improved circuit for a memory controller having a variable zone size, and a method of operating the circuit.

In the improved circuit and method, a memory is divided into a plurality of zones, and each zone is divided into a plurality of sub-zones. In one embodiment, the memory may be divided into eight sub-zones. This figure of eight sub-zones is convenient, since this allows each sub-zone to have some ability to handle bad blocks and allows each sub-zone to be the same size. In another embodiment the plurality of sub-zones may comprise a range between 8 and 16 sub-zones. In yet another embodiment, the plurality of sub-zones may comprise a range between 2 and 32 sub-zones. Of course, in other embodiments the number of sub-zones may be different.

The improved solution comprises a method of partitioning a memory. This method comprises dividing the memory into a first plurality of sub-zones, and allocating a plurality of spare blocks in each of the first plurality of sub-zones. The method further comprises resizing the first plurality of sub-zones to a second plurality of sub-zones different from the first plurality, and reallocating the plurality of spare blocks among the second plurality of sub-zones. The step of dividing the memory into a first plurality of sub-zones comprises determining the sub-zone size by examining entries in a logical to physical table, and assigning logical boundaries of the sub-zones on a binary boundary.

In one embodiment of the improved method, the plurality of sub-zones may comprise a range between 8 and 16 sub-zones. In another embodiment, the plurality of sub-zones may comprise a range between 2 and 32 sub-zones. In one embodiment the step of resizing sub-zones comprises dynamically resizing the sub-zones to maintain a desired number of available erased blocks. In another embodiment, the step of resizing sub-zones comprises statically pausing the memory operation and resizing the sub-zones when a threshold level of bad blocks has been reached in the memory, and then restarting the memory.

Figure 1:
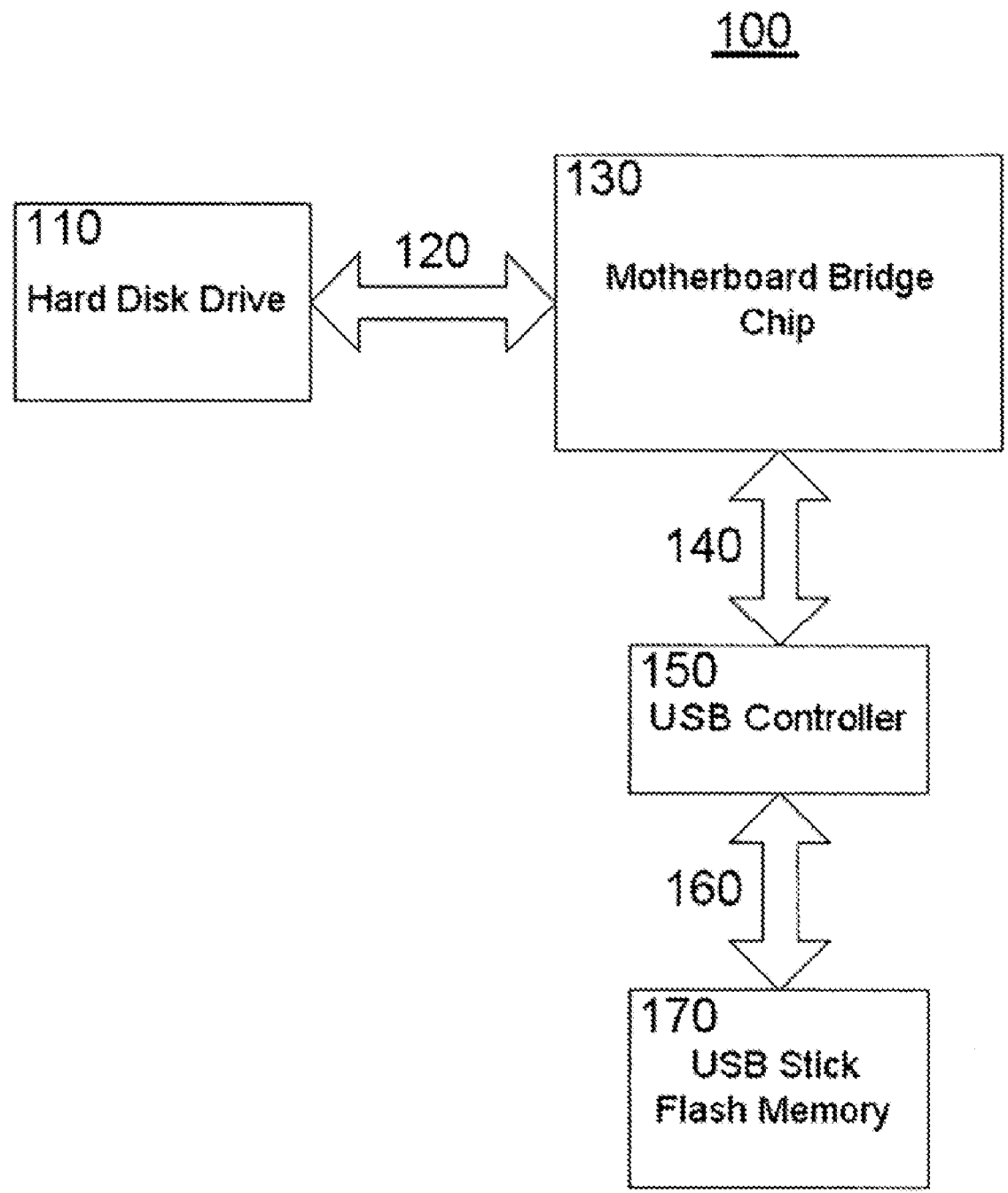
FIG. 1 illustrates a first conventional computer system 100 using an external memory as a disk cache.
Figure 2:
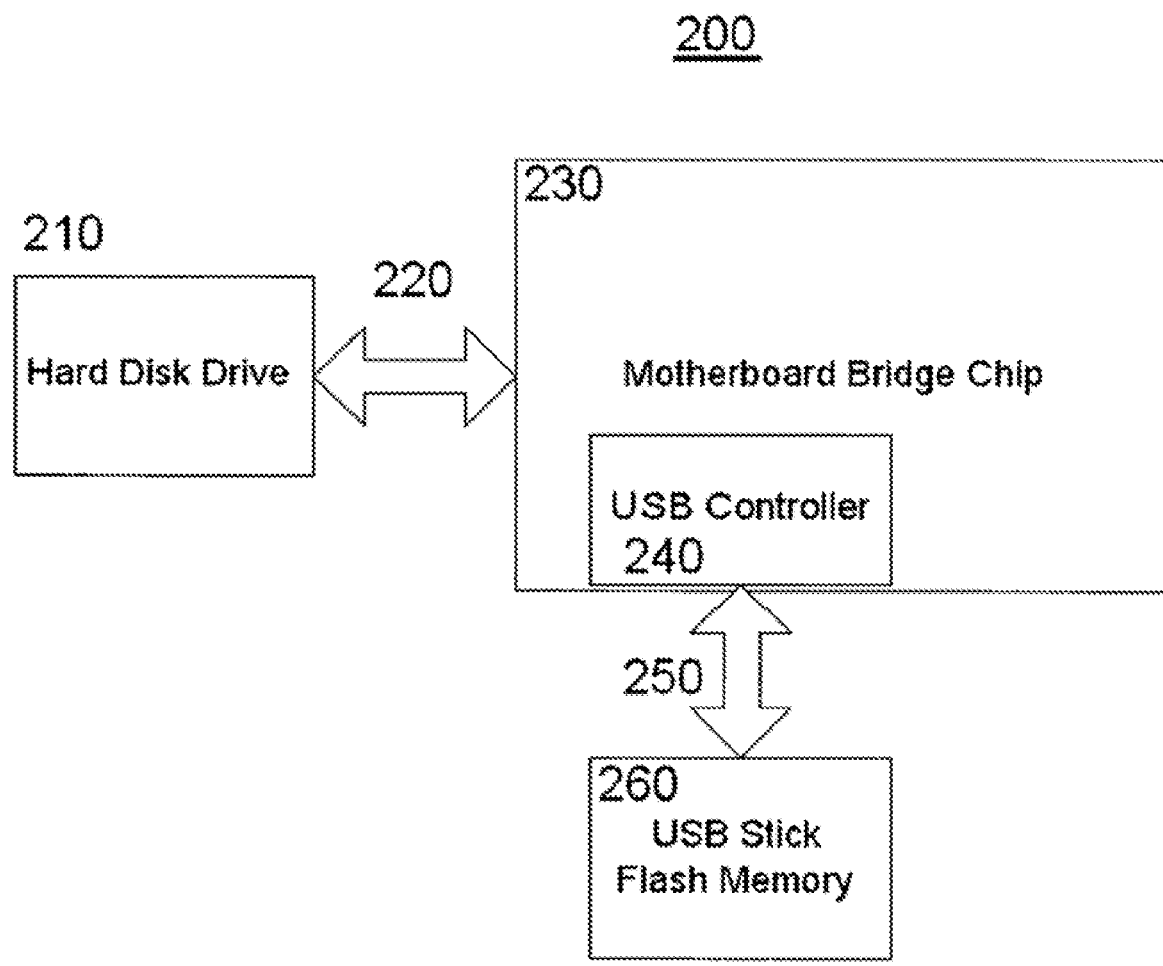
FIG. 2 illustrates a second conventional computer system 200 using an external memory as a disk cache.
Figure 3:
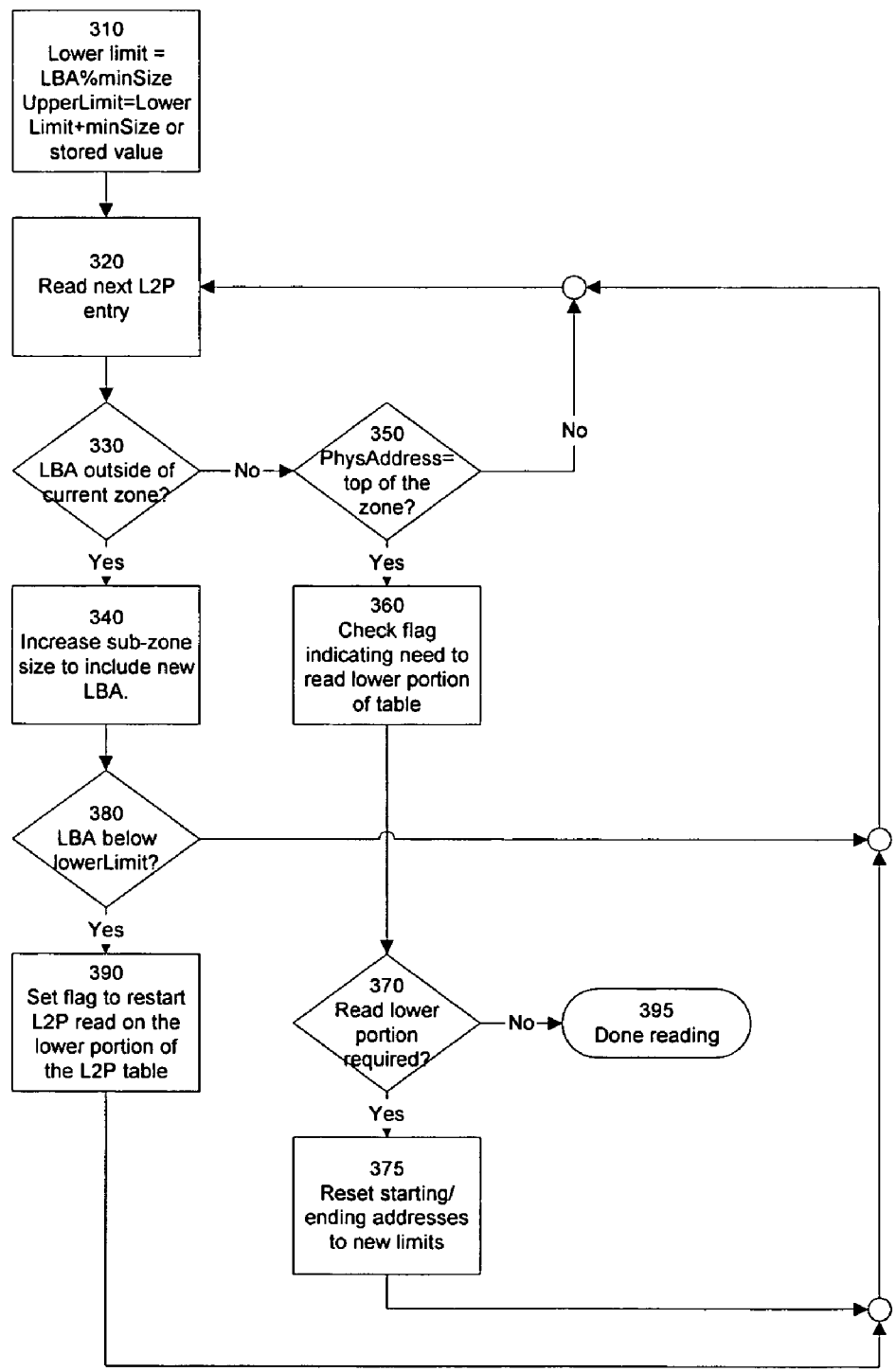
FIG. 3 illustrates a flowchart of a method of changing zone sizes in a logical to physical table.

FIG. 3 shows a flowchart 300 of a method of changing zone sizes in a logical to physical table. A first step 310 comprises initializing the zone size threshold to a minimum or to a stored value. The L2P read starts at the lower limit and completes at the upper limit. The table is loaded in minimum size (minSize) chunks. For example, a table with a minSize of 100 is broken into 10 chunks, 0-99, 100-199, 200-299, etc.

A second step 320 comprises reading a next entry in the logical to physical table. A third step 330 comprises determining if the LBA (logical block address) is outside of the current zone. If the LBA is not outside of the current zone, then step 350 checks if the physical address is equal to the top of the zone. If not, then step 320 is repeated. If the physical address is equal to the top of the zone, then step 360 checks if a flag indicates a need to read the lower portion of the logical to physical table. If the LBA is outside of the current zone, then in fourth step 340 the zone size is increased to include the new LBA. Step 380 checks if the logic block array is below the lower limit. If so then step 390 sets a flag to restart the logical to physical read on the lower portion of the logical to physical table, and step 320 repeats. If the logic block array is not below the lower limit, then step 320 repeats.

Following step 360, then step 370 checks if a read of the lower portion of the logical to physical table is required. If not, then at step 395 the reading stops. If a read of the lower portion is required, then step 375 resets the starting and ending addresses to new limits, and then step 320 repeats.

The new zone size can increase the upper limit of the zone, reduce the lower limit of the new zone size or both. Step 380 checks to see if the lower limit has been reset. If so, step 390 sets a flag that will be read by step 360. This flag restarts the L2P read if the lower limit has been reset. Step 350 determines if the end of the table has been reached. If the end of the table has been reached, Step 360 checks the flag set earlier to determine if there are additional (lower) entries to read.

Figure 4:
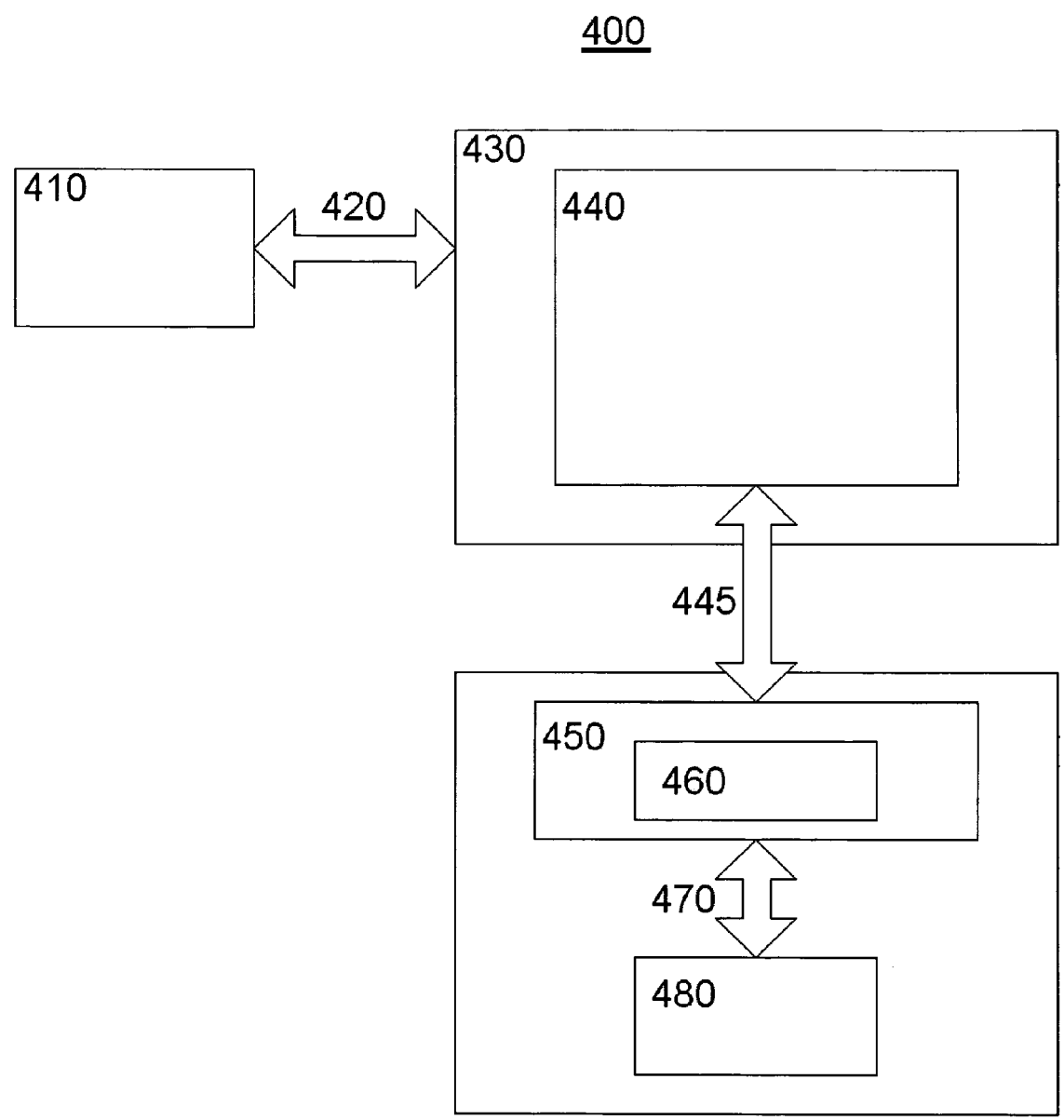
FIG. 4 illustrates a first system with an improved memory controller having a variable zone size.

FIG. 4 describes first system 400 comprising an improved memory controller having a variable zone size. The system 400 comprises a mass storage device 410 (in one embodiment a hard disk drive or optical disk drive or compact disk drive or digital video disk drive), a motherboard 430 coupled to the mass storage device 410 by an interface 420, a bridge controller 440 attached to the motherboard 430, and a USB bus 445 coupled to the bridge controller 440.

The system 400 further comprises a USB controller 450 and a memory controller 460 wherein the memory controller is configurable to resize sub-zones in a memory and is configurable to allocate spare blocks among the sub-zones. The system further comprises a non-volatile memory cache 480, and a memory interface 470 coupled between the memory controller and the non-volatile memory cache. In one embodiment the memory controller 460 is located within the USB controller 450, where 450 and 460 are in a single computer chip package).

In one embodiment interface 470 is a NAND memory interface. In one embodiment the non-volatile memory cache 480 comprises a NAND flash memory cache. In other embodiments the memory cache 480 could comprise a NOR flash memory, a portable media player, a memory card (for example a secure digital or compact flash or other non-volatile device), or any other form of non-volatile memory, or a volatile memory.

The arrangement of USB host controller 450 and memory controller 460, memory interface 470 and memory cache 480 may be in the form of a USB 'thumb drive' storage device, a portable media player, a portable media recorder, a digital camera, a dedicated external non-volatile memory device, or any other device having non-volatile memory that interfaces with a personal computer.

In an alternative embodiment, a motherboard 430 may have attached to it bridge controller 440, USB controller 450, memory controller 460, and memory cache 480. The memory cache 480 may comprise a flash memory cache, a non-volatile memory, or a volatile memory.

Figure 5:
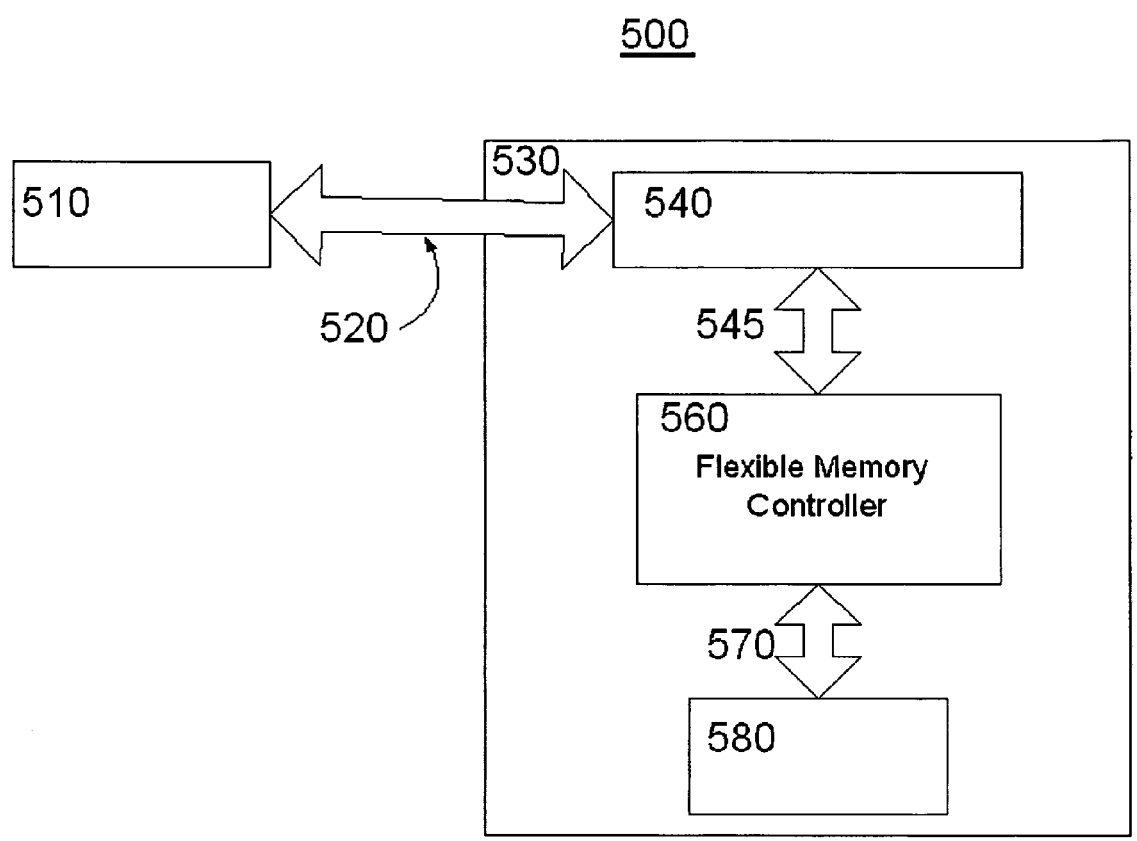
FIG. 5 illustrates a second system with an improved memory controller having a variable zone size.

FIG. 5 describes a second system 500 comprising an improved memory controller having a variable zone size. The system 500 comprises a mass storage device 510 (in one embodiment a hard disk drive or optical disk drive or compact disk drive or digital video disk-drive). The system 500 further comprises a bridge controller 540 to which the mass storage device 510 is coupled by interface 520. A memory controller 560 is coupled to the mass storage device 510 by interface 545, wherein the memory controller 560 is configurable to resize sub-zones in a memory and is configurable to allocate spare blocks among the sub-zones. The system further comprises a non-volatile memory cache 580, and a bus interface 570 coupled between the memory controller 560 and the non-volatile memory cache 580. In system 500, the bus interface 570 may be any type of bus interface, including (but not limited to) PCIe (PCI Express), IEEE 1394, or Ethernet, Gigabit Ethernet or any other high speed bus interface.

Figure 6:
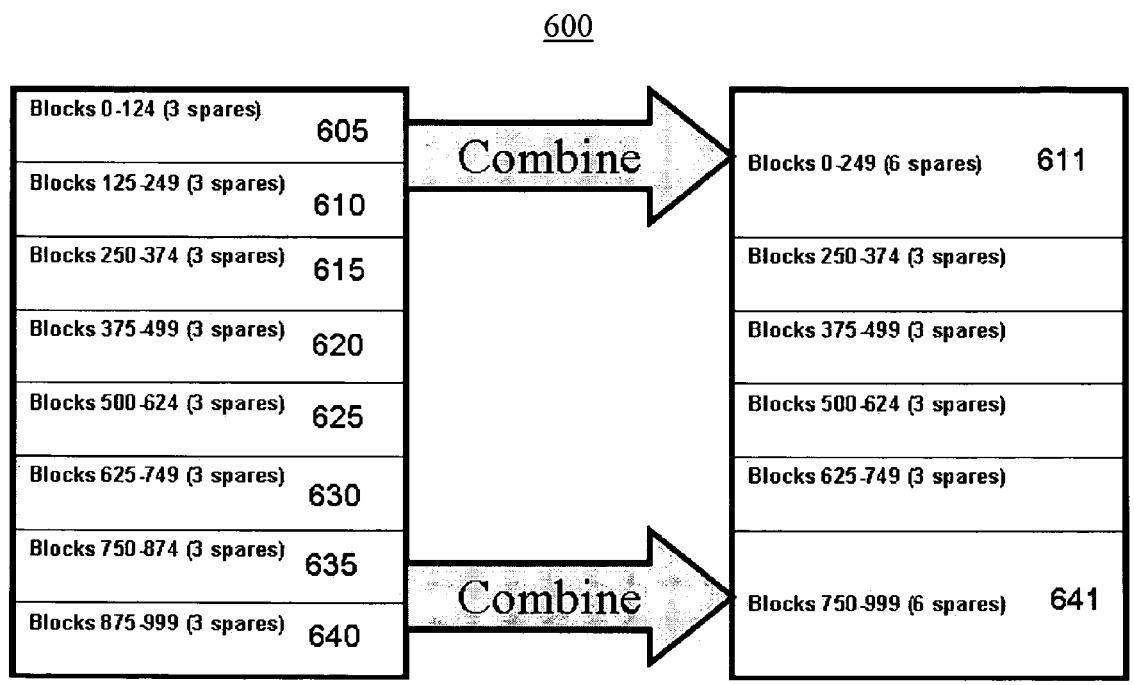
FIG. 6 illustrates operation of a method of changing zone size in a memory.

FIG. 6 shows operation 600 of a method of changing zone size in a memory. When a zone table 605 runs out of bad blocks, it is combined with an adjacent sub-zone table 610. A preferred embodiment is to keep zone tables aligned on size boundaries, so a 125-length block representing address 125-249 (zone table 610) would always be combined with a block representing address 0-124 (zone table 605) forming combined block 611. This makes it possible to determine the size of the sub-zone by looking at the entries in the table. Similarly, in FIG. 6 a 125-length block representing address 875-999 (zone table 640 are combined with a block representing address 750-874 (zone table 635) forming combined block 641.

FIG. 6 shows a method to improve the time required to load a zone table by reducing the zone size. In an alternate embodiment, a further increase (in one case double) in performance can be created by stopping the sub-zone table load when the target block is located and continuing to load the zone table only if there is another read in the same sub-zone. The alternate embodiment for reducing the time required to load the zone table is to incrementally load the table. This cuts the average zone load time in half. Writing to the table would still require a full zone table load to allow a full wear leveling implementation.

Figure 7:
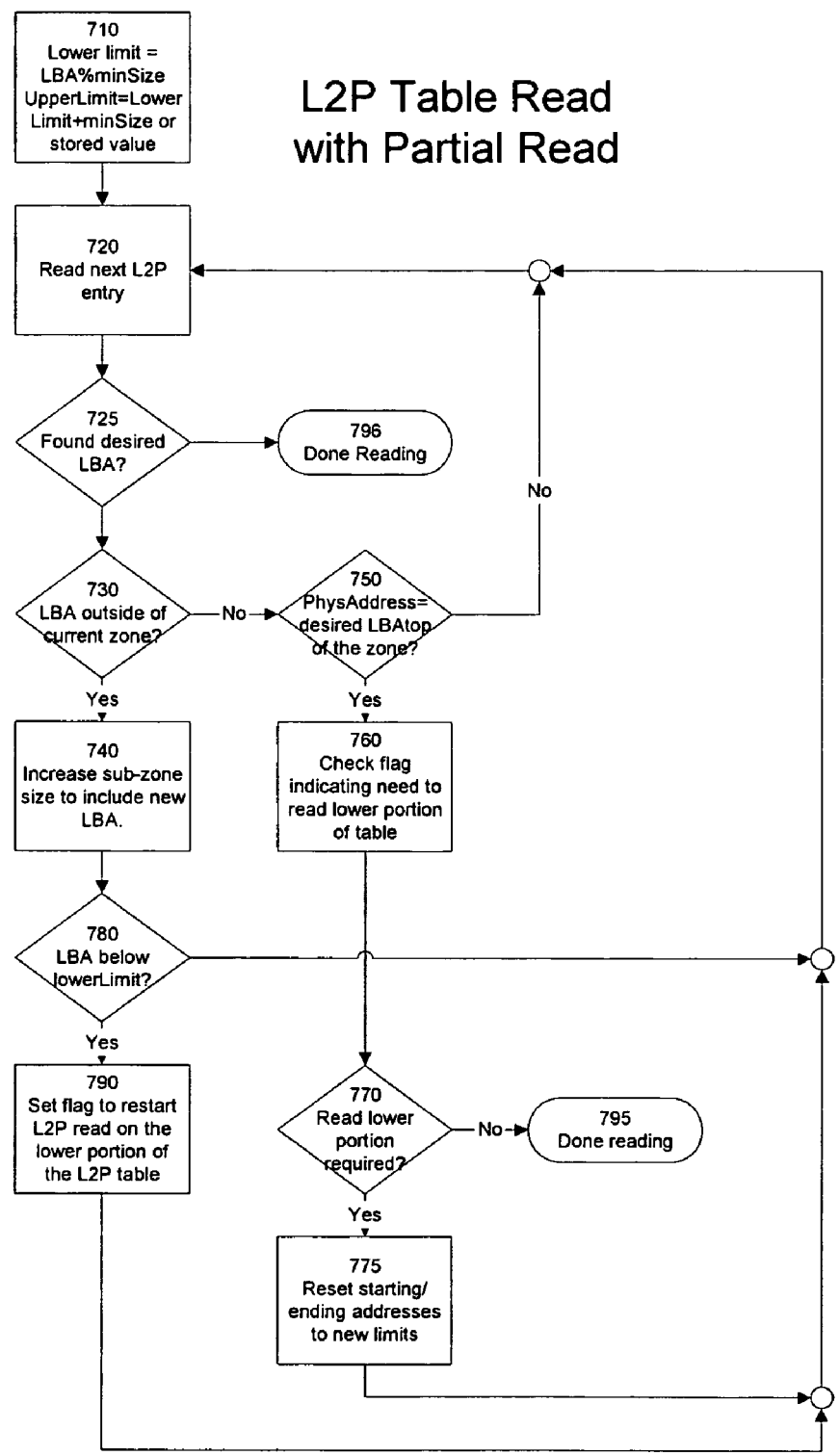
FIG. 7 illustrates a flowchart of and alternative method of changing zone sizes in a logical to physical table.

FIG. 7 shows a flowchart 700 of a alternative method of changing zone sizes in a logical to physical table. A first step 710 comprises initializing the zone size threshold to a minimum or to a stored value. The L2P read starts at the lower limit and completes at the upper limit. The table is loaded in minimum size (minSize) chunks. For example, a table with a minSize of 100 is broken into 10 chunks, 0-99, 100-199, 200-299, etc.

A second step 720 comprises reading a next entry in the logical to physical table. Step 725 checks if the desired logic block address (LBA) has been found yet, and if this is true, then moves to step 796 where reading of the logical to physical table stops. If the desired logic block address has not been found yet, the method proceeds to third step 730.

The third step 730 comprises determining if the LBA (logical block address) is outside of the current zone. If the LBA is not outside of the current zone, then step 750 checks if the physical address is equal to the top of the zone. If not, then step 720 is repeated. If the physical address is equal to the top of the zone, then step 760 checks if a flag indicates a need to read the lower portion of the logical to physical table. If the LBA is outside of the current zone, then in fourth step 740 the zone size is increased to include the new LBA. Step 780 checks if the logic block array is below the lower limit. If so then step 790 sets a flag to restart the logical to physical read on the lower portion of the logical to physical table, and step 720 repeats. If the logic block array is not below the lower limit, then step 720 repeats.

Following step 760, then step 770 checks if a read of the lower portion of the logical to physical table is required. If not, then at step 795 the reading stops. If a read of the lower portion is required, then step 775 resets the starting and ending addresses to new limits, and then step 720 repeats.

The new zone size can increase the upper limit of the zone, reduce the lower limit of the new zone size or both. Step 780 checks to see if the lower limit has been reset. If so, step 790 sets a flag that will be read by step 760. This flag restarts the L2P read if the lower limit has been reset. Step 750 determines if the end of the table has been reached. If the end of the table has been reached, Step 760 checks the flag set earlier to determine if there are additional (lower) entries to read. An additional check is added in the code (not shown in the Figure) to re-read the table if it has only been partially read.

In one embodiment a non-volatile memory may be configured with 24 sub-zones of 42 or 43 blocks each, with 1 spare block. In another embodiment, a non-volatile memory may be configured as 8 sub-zones of 125 blocks with 3 spare blocks. The embodiment with 8 sub-zones cuts the zone change overhead by 87.5% and allows greater granularity of zones in the memory. In another embodiment, a non-volatile memory may be configured as 2 sub-zones of 500 blocks with 12 spare blocks each. The practical range of number of sub-zones into which a memory can be divided is approximately between a maximum of 32 and a minimum of 2, with a preferred range of 24 to 8. These values are assuming that the memory is split into zones of 1000 blocks each (as is typically done with Flash memory configurations). In other embodiments, the number of blocks per zone could be chosen as another value.

There is a trade off between increasing the number of sub-zones (and increasing efficiency), and losing spare blocks. Spare blocks are required to deal with bad blocks and partial block copy operations. The memory controller may react to bad blocks by combining zones, and when all of the spares are bad, combine adjacent sub-zones. Aligning the combined blocks on binary boundaries eases management.

Benefits of the improved method over the conventional solution can be seen in the following example using a conventional NAND flash device with 4 zones and a controller that can hold 2 zone tables. If the conventional NAND flash is used as a memory cache, access is almost entirely random, so the probability of a zone miss is one in two, i.e 50%. Since the zone tables cover 1024 blocks, zone misses cause an average of 50%*1024=512 operations for every block that is fetched. The conventional solution causes a significant performance hit in the conventional NAND flash device.

However in the improved solution although the sub-zones are smaller, the memory size is the same, so a larger number of sub-zones is used. This makes the probability of a zone miss the same (½). However, since the sub-zone size is much smaller, it loads much faster. Using an architecture of eight sub-zones per zone, zone misses cause an average of ½*125=63 operations for every block that is fetched, an 87% improvement over the conventional solution.

In an alternate embodiment, the zone combining operation could be performed statically, for example on power up, or by reacting to an exceptional event by disconnecting from the host and reconnecting. In a first alternate embodiment, the zone combination could be performed on powerup. In a second alternate embodiment more spare blocks could be allocated from the beginning of operations, so the likelihood of running out of blocks would be reduced. In a third alternate embodiment the threshold limit to trigger the exceptional event could be set lower so the system does not run out of blocks as frequently. In a fourth alternate embodiment, when an idle period occurs where the computer is not actively being used (such as when the screensaver is active, or after a certain period of non-use by the operator, or at a predetermined time (such as lunchtime or evening for an office computer) when the computer is likely to be used less.

Embodiments of the present invention are well suited to performing various other steps or variations of the steps recited herein, and in a sequence other than that depicted and/or described herein. In one embodiment, such a process is carried out by processors and other electrical and electronic components, e.g., executing computer readable and computer executable instructions comprising code contained in a computer usable medium.

For purposes of clarity, many of the details of the improved circuit and method and the methods of designing and manufacturing the same that are widely known and are not relevant to the present invention have been omitted from the following description.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method of partitioning a memory, the method comprising:
    dividing the memory into a first plurality of sub-zones;
    allocating a plurality of spare blocks in each of the first plurality of sub-zones;
    resizing the first plurality of sub-zones to a second plurality of sub-zones different from the first plurality; and
    reallocating by a controller the plurality of spare blocks among the second plurality of sub-zones.

2. The method of claim 1, wherein the dividing the memory into the first plurality of sub-zones comprises determining the sub-zone size by examining entries in a logical to physical table.

3. The method of claim 2, further comprising assigning logical boundaries of the sub-zones on a binary boundary.

4. The method of claim 2 wherein the plurality of sub-zones comprises a range between 8 and 16 sub-zones.

5. The method of claim 2 wherein the plurality of sub-zones comprises a range between 2 and 24 sub-zones.

6. The method of claim 1, wherein the resizing sub-zones comprises dynamically resizing the sub-zones to maintain a desired number of available erased blocks.

7. The method of claim 1, wherein the resizing sub-zones comprises statically pausing memory operation and resizing the sub-zones when a threshold level of bad blocks has been reached in the memory, and then restarting the memory.

8. A memory controller, comprising:
    means for dividing the memory into a first plurality of sub-zones; means for allocating a plurality of spare blocks in each of the first plurality of sub-zones;
    means for resizing the first plurality of sub-zones to a second plurality of subzones different from the first plurality; and
    means for reallocating the plurality of spare blocks among the second plurality of sub-zones.

9. The memory controller of claim 8, further comprising means for assigning logical boundaries of the sub-zones on a binary boundary.

10. The memory controller of claim 9, further comprising means for dynamically resizing the sub-zones to maintain a desired number of available erased blocks.

11. The memory controller of claim 9, wherein the first plurality of sub-zones comprises a range between 8 and 16 sub-zones.

12. The memory controller of claim 9, wherein the first plurality of sub-zones comprises a range between 2 and 24 sub-zones.

13. A circuit, comprising:
    a memory controller configurable to allocate spare blocks among a first plurality of sub-zones in a memory, configurable to resize the first plurality of sub-zones to a second plurality of sub-zones and configurable to reallocate the spare blocks among the second plurality of sub-zones;
a non-volatile memory cache; and
a memory interface coupled between the memory controller and the non-volatile memory cache.

14. The circuit of claim 13, further comprising a mass storage device coupled to the memory controller.

15. The circuit of claim 14, further comprising a bridge controller to which the memory controller is coupled by a bus interface.

16. The circuit of claim 15, further comprising a host controller device coupled to the bus interface.

17. The circuit of claim 16, wherein the memory controller IS located within the host controller device.

18. The circuit of claim 17, wherein the bus interface coupled between the memory controller and the non-volatile memory cache comprises a Universal Serial Bus (USB).

19. The circuit of claim 15, further comprising a motherboard to which the bridge controller, and the memory controller are attached.

20. The circuit of claim 13, wherein the non-volatile memory cache comprises flash memory.

* * * * *